United States Patent [19]

Kamimura et al.

[11] Patent Number: 5,031,103
[45] Date of Patent: Jul. 9, 1991

[54] POSITION DETECTOR FOR MOVING VEHICLE

[75] Inventors: Kenji Kamimura; Sadachika Tsuzuki, both of Saitama, Japan

[73] Assignee: Honda Giken Kogyo Kabushiki Kaisha, Tokyo, Japan

[21] Appl. No.: 413,935

[22] Filed: Sep. 28, 1989

[30] Foreign Application Priority Data

Oct. 13, 1988 [JP] Japan .................................. 63-257912

[51] Int. Cl.⁵ ............................................. G06F 15/50
[52] U.S. Cl. .............................. 364/449; 364/424.02; 318/587; 365/375; 180/167; 180/169
[58] Field of Search .................... 364/443, 449, 424.02; 250/560, 561; 180/167–169; 358/103; 318/587; 356/1, 152, 375

[56] References Cited

U.S. PATENT DOCUMENTS

| | | | |
|---|---|---|---|
| 3,687,556 | 7/1972 | Price et al. | 356/1 |
| 4,225,226 | 9/1980 | Davidson et al. | 364/449 |
| 4,305,077 | 12/1981 | Tsumura . | |
| 4,309,758 | 1/1982 | Halsall et al. | 364/449 |
| 4,626,995 | 12/1986 | Lofgren et al. | 364/449 |
| 4,700,301 | 10/1987 | Dyke | 356/1 |
| 4,796,198 | 10/1989 | Boultinghouse et al. | 250/561 |
| 4,818,107 | 4/1989 | Ono et al. | 356/375 |
| 4,936,678 | 6/1990 | Gordon et al. | 356/375 |
| 4,964,722 | 10/1990 | Schumacher | 356/152 |

*Primary Examiner*—Gary Chin
*Attorney, Agent, or Firm*—Pollock, Vande Sande and Priddy

[57] ABSTRACT

A steering system for a moving vehicle wherein light signals are received from light beam source means provided at four reference points apart from the moving vehicle includes a position detector for determining a current position of the moving vehicle based on the received light signals and information on the reference points, the position detector comprising a beam receiver means for receiving the light signals which is mounted on the moving vehicle and rotatable in the horizontal plane, a means for detecting azimuths of the reference points with respect to the advance direction of the moving vehicle on the basis of the received light signals, a means for calculating two differential azimuths between two pairs of reference points disposed at diagonal positions viewed from the moving vehicle, and a calculating means for calculating the position of the moving vehicle on the basis of the azimuths, the differential azimuthes, and the positional information of the reference points.

5 Claims, 7 Drawing Sheets

POSITION DETECTOR FOR MOVING VEHICLE

BACKGROUND OF THE INVENTION

1. Field of the Invention

The present invention relates to a position detector for a moving vehicle, and more particularly to a steering control system for traveling a moving automobile, an unmanned mobile and carrying device in a factory, or a vehicle for use in agriculture, civil engineering and the like along a predetermined traveling course.

2. Description of the Prior Art

Heretofore, as a system for detecting a present position of a moving body such as the moving vehicles described above, there has been proposed a system provided with a means for scanning a light beam emitted from a moving body in the circumferential direction or every azimuthal direction centering around the moving body, light-reflecting means for reflecting the light beam in the direction of incident light and secured at least three positions apart from the moving body, and a beam receiver means for receiving light reflected from the light-reflecting means (the Japanese Patent Laid-open No. 67476/1984).

In the above mentioned prior art, differential azimuths between adjoining two of three light-reflecting means centering around the moving body are detected on the basis of received beam Output of the light-receiving means, and then a position of the moving body is determined based on the detected differential azimuths and positional information of the light-reflecting means which have been previously set.

In such a prior art system, if a moving bodY having a beam-receiving means mounted thereon is positioned in the neighborhood of the central portion of a triangle with the respective light-reflecting means secured at the three positions as the vertexes, the position of the moving body can be detected with a fairly high precision. However, there was a problem that, in a position apart from the neighborhood of the central portion of the triangle, it was difficult to obtain a high measuring precision.

As a countermeasure therefor, for instance, as described in the Japanese Patent Laid-open No. 14114/1985 or No. 15508/1905, there have been proposed methods for measuring the position of a moving body wherein reference points are set on the vertexes of a quadrangle surrounding the area in which the moving body travels, optimum three reference points of the four reference points with which a high measuring precision can be expected are selected, and the positional detection of the moving body is performed on the basis of the positional information of the selected three reference points and the azimuths of the reference points viewed from the moving body.

In the method described in the Japanese Patent Laidopen No. 14114/1985 of the above-mentioned methods for measuring the position of the moving body, first the position of the moving body is temporarily operated on the basis of the azimuths of the four reference points, the reference point Of said four reference points nearest the moving body is determined, and the position of the moving body is operated again on the basis of the positional informations and azimuths of the reference point nearest the moving body and two additional reference points at both sides of the nearest reference point, a total of three reference points.

On the other hand, also in the method described in the Japanese Patent Laid-open No. 15508/1985, based on the temporarily determined position of the moving body, a triangle surrounding the moving body is found, three reference points which are the three vertexes of this triangle are selected, and the position of the moving body is redetermined from the positional information and azimuths of the selected three reference points.

Thus, in the prior art, there was a problem that the procedure for selecting the reference points to be used for operating the position of a moving body (hereinafter referred to as a moving vehicle) was complicated.

In order to accurately detect the position of the moving vehicle, accurate positions of the above reference points must be set in an arithmetic operation device in advance. However, an initial setting of the reference points may sometimes be deviated from the real positions thereof. In that case, an error occurs in the detection of the position of the moving vehicle. And the error has a directionality in such a way that a detected position of the moving vehicle is always deviated, for example, to the right of the real position when a reference position to be used for detection is fixed. Hence, it is often confined within the tolerable range of small errors.

However, when some of the optimum reference points based on which high measurement accuracy can be expected, are selected from many reference points and the selected reference points are switched depending on the current position of the moving vehicle, the direction or polarity of the error in the detected position data of the moving vehicle may be inverted (e.g., the deviation in the right direction is inverted to a deviation in the left direction) at the time of said switching. In this case, an error two times the magnitude of the error present before the reference points have been switched will occur, so a countermeasure therefor is required.

Furthermore, the countermeasure has been needed due to the fact that the detected positions of the moving vehicle become unsuccessive by the switching of the reference points, and the detection data is discontinued.

SUMMARY OF THE INVENTION

An object of the present invention is to solve the above described problems of the prior art and to provide a vehicle steering system which includes a position detector capable of detecting a position with a high accuracy on the basis of positions and azimuths of the four reference points provided to detect the position of a moving vehicle.

In order to solve the above described problems, the present invention is characterized by a position detector for a moving vehicle wherein light signals are received from light beam source means provided at four reference points apart from the moving vehicle and a current position of the moving vehicle is detected based on the received light signals and information on the reference points, the position detector comprising a beam receiver means for receiving the light signals which is mounted on the moving vehicle and rotatable in the horizontal plane, a means for detecting azimuths of the reference points with respect to the advance direction of the moving vehicle on the basis of the light beam signals provided by the beam receiver means, a means for calculating two differential azimuths between two pairs of reference points disposed at diagonal positions viewed from the moving vehicle, and a calculating means for calculating the position of the moving vehicle on the basis of the azimuths, the differential azimuths, and the positional information of the reference points.

The present invention is also characterized in that the moving vehicle further comprises a light beam source means which is mounted on the moving vehicle to be rotatable along with the beam receiver means, and light reflecting means are disposed on the reference points to reflect the light radiated from the light beam source means to the incidence direction thereof.

According to the present invention, the position of the moving vehicle can be successively detected on the basis of the positional information of the four reference points disposed at four places, the azimuths of the reference points around the moving vehicle, and differential azimuths between each pair of reference points disposed at the diagonal points, so the accuracy of the position detection for the moving vehicle can be improved.

DETAILED DESCRIPTION OF THE PREFERRED EMBODIMENTS

Figure 9:
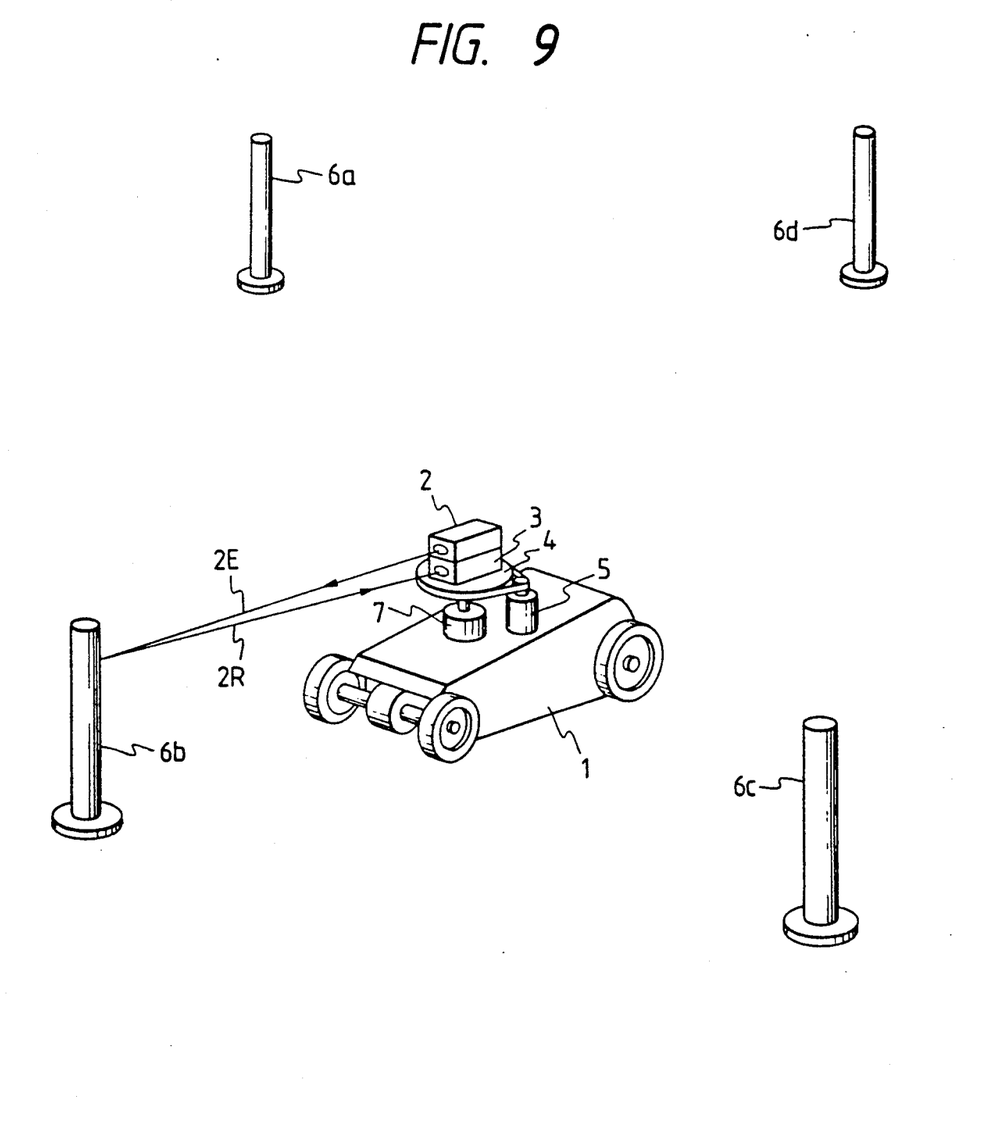
FIG. 9 is a perspective diagram showing the moving vehicle and the reflectors.

An embodiment of the present invention will be described hereinbelow by referring to the accompanying drawings. FIG. 9 is a perspective view showing a state of arrangement in respect of a moving vehicle carrying the control system according to the present invention and four light reflectors disposed in an area in which the moving vehicle travels.

In FIG. 9, the moving vehicle 1 is one for use in agricultural working such as a lawn mower and the like. A rotating table 4 driven by a motor 5 is mounted on the upper part of the moving vehicle 1. The rotating table 4 mounts a beam source 2 for emitting light beam 2E and a beam receiver 3 for receiving light beams 2R reflected by each of the reflectors 6a-6d. The beam source 2 is provided with a light beam emitting mean (light-emitting diode) and the beam receiver 3 is provided with a means for receiving incident light to convert it into an electrical signal (photo-diode) (both of them are not shown). Furthermore a rotary encoder 7 is disposed so as to be interlocked with a drive shaft of the rotating table 4, so that when pulses output from the rotary encoder 7 are counted, a turning angle of the rotating table 4 can be detected.

The reflectors 6a-6d are located around a working area of the moving vehicle 1. Each of the reflectors 6a-6d has a reflection surface reflecting incident light in the incident direction and for this purpose, a so-called corner cube prism which has been conventionallY available on the market and the like may be used.

Next, the construction of the control sYstem in the present embodiment will be described in accordance with the block diagram of FIG. 1 wherein the light beam 2E emitted from the beam source 2 is scanned in a rotating direction of the rotating table 4 and the light beam 2E is reflected by one of the reflectors 6a-6d. The light beam 2R reflected by the one of the reflectors 6a-6d is introduced into the beam receiver 3.

In a counter 9, the number of pulses output from the rotary encoder 7 is counted in accordance with rotation of the rotating table 4. The counted value of the pulses is transferred to an angle detection means 10 whenever reflected light is received by the beam receiver 3. In the angle detection means 10, each angle defined between the adjoining two reflectors 6a-6c, respectively, viewed from the moving vehicle 1, i.e., differential azimuth is calculated on the basis of the counted value of the pulses transferred in every reception of the reflected light beam.

In the angle detection means 10, two differential azimuths between each pair of reflectors disposed at diagonal positions are calculated based on the azimuths of reflectors 6. The differential azimuth between a pair of reflectors disposed at diagonal positions may be calculated on the basis of the azimuths of the reflectors 6, or calculated by arranging in such a way that the count value of the pulses is transferred to the angle detection means !0 whenever the reflected light from the pair of reflectors disposed at diagonal positions is received.

In a position-advance direction operating means 13, coordinates and an advance direction of the moving vehicle 1 are calculated in accordance with formulas described hereinafter, and the results of the operation are inputted to a comparing means 25. In the comparing means 25, data indicating a traveling course set in a traveling course setting means 16 are compared with the coordinates and the advance direction of the moving vehicle 1 obtained in the position advance direction operating means 13.

The comparison results are supplied to steering means 14, and a steering motor (M) 35 connected to front wheels 17 of the moving vehicle is driven on the basis of the above mentioned comparative results. An angle of steering for the front wheels 17 driven by the steering motOr 35 is detected by means of a steering angle sensor 15 mounted on the front wheels of the moving vehicle 1, and the value detected is fed back to the steering means 14.

A driving means 18 controls starting and stopping of an engine 19 as well as operation of a clutch 20 for transmitting the power of the engine 19 to rear wheels 21.

Figure 1:
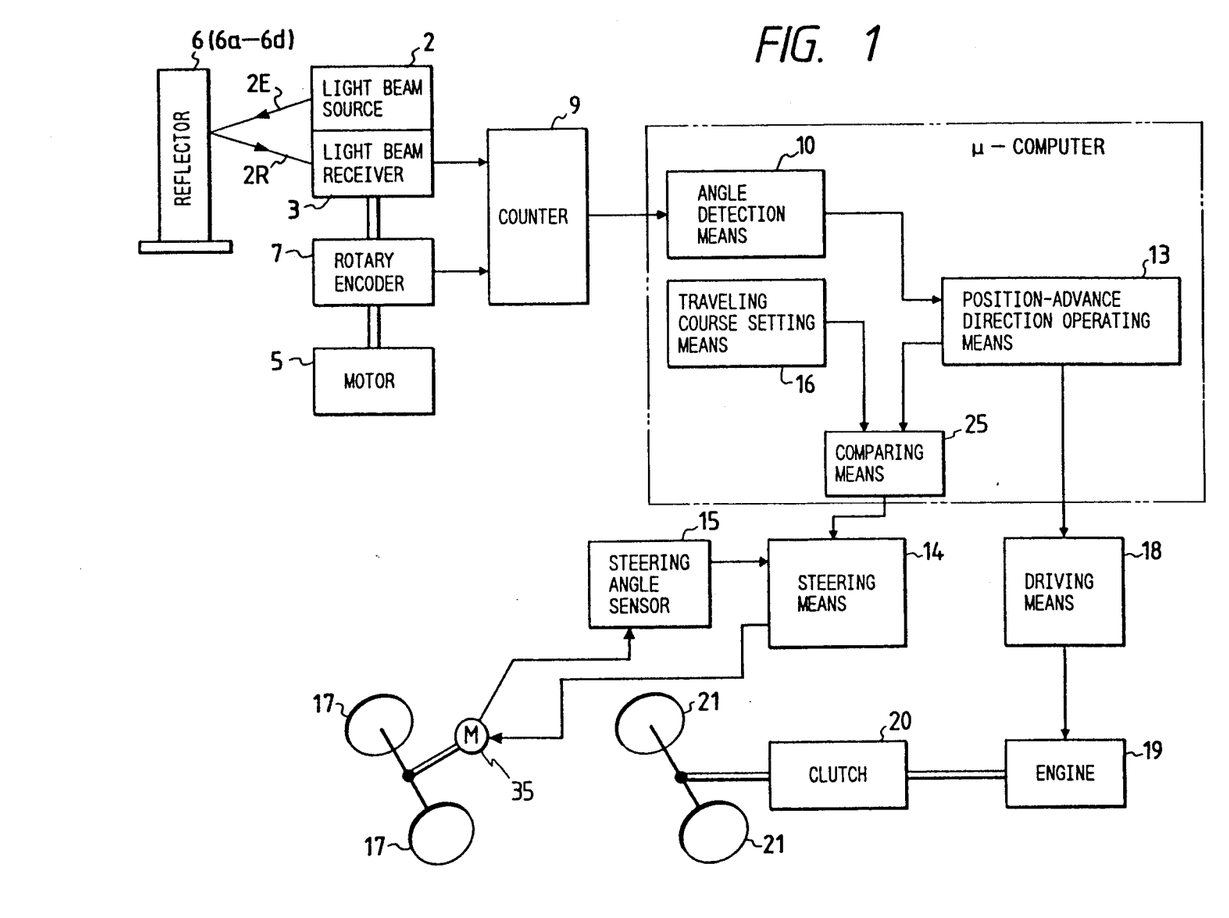
FIG. 1 is a block diagram illustrating an embodiment of the present invention.

Incidentally, of the structural elements shown in FIG. 1, the portion surrounded bY a chain line may be constructed by a microcomputer.

An example of calculating formulas for detecting the position and the advance direction of the moving vehicle 1 in accordance with this embodiment having the above described construction will be shown. FIGS. 2–7 show positions of the moving vehicle 1 and the reflectors 6 on the coordinate system for indicating the working range of the moving vehicle 1.

Figure 2:
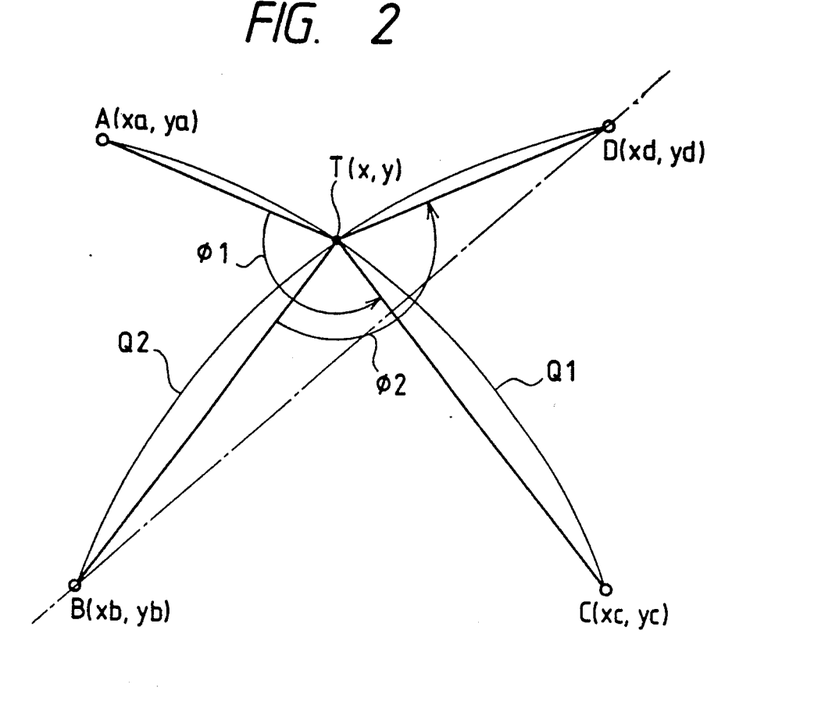
FIG. 2 is an explanatory view for explaining the principle of detecting the position of the moving vehicle.
Figure 3:
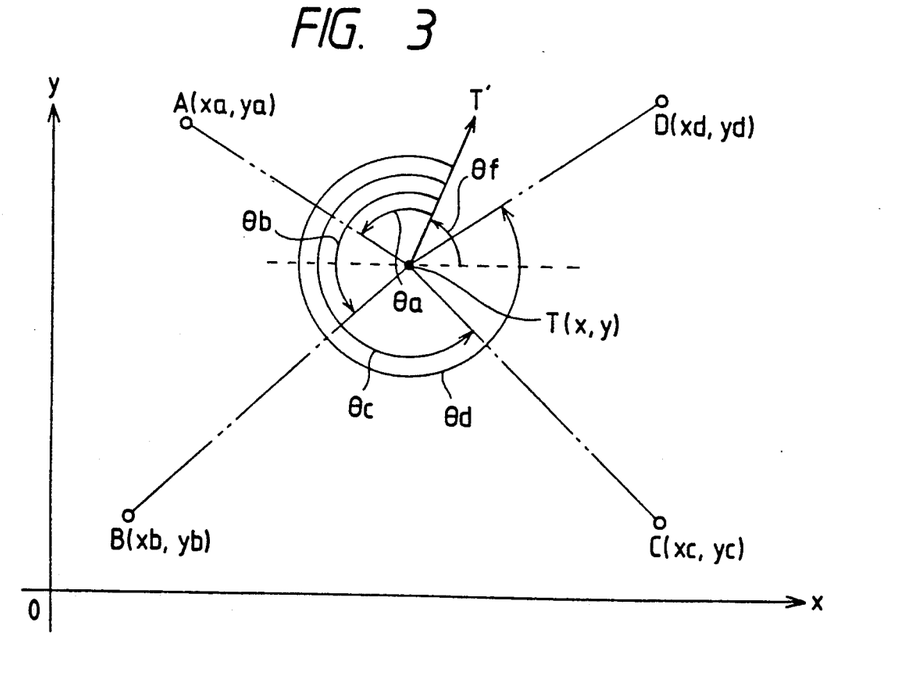
FIG. 3 is an explanatory view for explaining the principle of detecting the advance direction of the moving vehicle.

In FIGS. 2 and 3, four reflectors 6a–6d are located on reference points A, B, C, and D, respectively. The positions of the reflectors 6a–6d are expressed on the x - y coordinate system. The current position of the moving vehicle 1 is expressed by the coordinate T(x, y), and the advance direction TT' thereof with respect to the x axis is expressed by $\theta f$.

As is apparent from FIG. 2, an arc Q1 is a part of the circle passing through a pair of reference points A and C disposed at the diagonal positions, and the position T of the moving vehicle 1. An arc Q2 is a part of the circle passing through another pair of reference points B and D, and the position T of the moving vehicle 1. The current position T of the moving vehicle 1 is at an intersection of the arcs Q1 and Q2 (hereinafter referred to as circles Q1 and Q2). Hence, the position of the moving vehicle 1 can be determined by calculating the coordinates of the intersection of the circles Q1 and Q2.

First, the equations of the circles Q1 and Q2 are given by the formulas (1) and (2), respectively.

$$x^2 + y^2 - a1 \cdot x - b1 \cdot y = c1 \quad (1)$$

$$x^2 + y^2 - a2 \cdot x - b2 \cdot y = c2 \quad (2)$$

where
a1 = (xa+xc)+(ya−yc)cot $\phi 1$
a2 = (xb+xd)+(yb−yd)cot $\phi 2$
b1 = (ya+yc)−(xa−xc)cot $\phi 1$
b2 = (yb+yd)−(xb−xd)cot $\phi 2$
c1 = −xa·xc−ya·yc+(xa·yc−xc·ya)cot $\phi 1$
c2 = −xb·xd−yb·yd+(xb·yd−xd·yb)cot $\phi 2$ From the formulas (1) and (2), the formulas (3) and (4) are induced.

$$x = (-F1 \pm \sqrt{F2})/F3 \quad (3)$$

$$y = -F4x - F5 \quad (4)$$

where
F1 = {2(a1−a2)(c1−c2)+(a1·b2−b1·a1)(b1−b2)$^2$ $$F2 = (b1 - b2)^2 (a1 \cdot b2 - b2 \cdot a2)^2 -$$
$$4(b1 - b2)^2 (c1 - b2)^2 +$$
$$4(b1 - b2)^3 (b1 \cdot c2 - b2 \cdot c1) +$$
$$4(a1 - a2)^2 (b1 - b2) (b1 \cdot c2 - b2 \cdot c1) +$$
$$4(a1 - a2) (b1 - b2) (c1 - c2) (a1 \cdot b2 - b1 \cdot a2)$$

F3 = 2{(a1-a2)$^2$}
F4 = (a1-a2)/(b1-b2)
F5 = (c1-c2)/(b1-b2)

Figure 4:
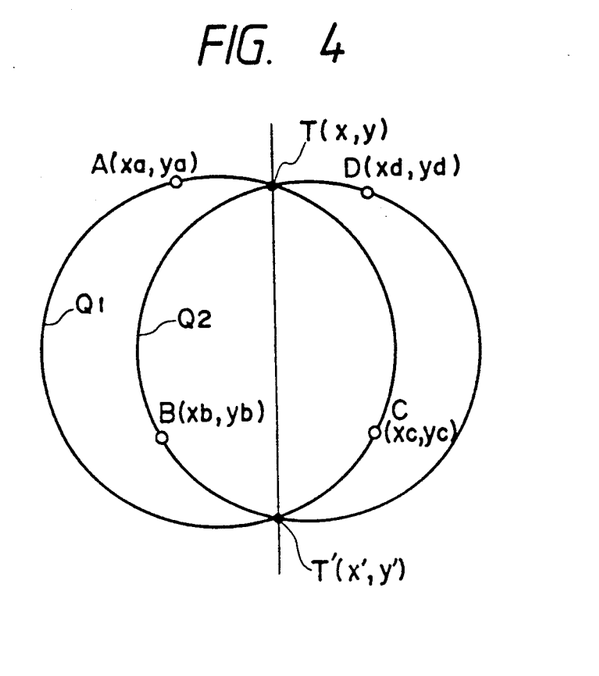
FIGS. 4, 5 and 6 are diagrams showing, respectively, the relationships between the position of the moving vehicle and the reference points disposed around the working area.

When b1=b2, and $\phi 1 \neq \pi$, $\phi 2 \neq \pi$, x and y are calculated by the following equations (5) and (6) as a first exceptional process. The positional relationships between the moving vehicle 1 and the reference points A-D in such a case are shown in FIG. 4.

$$x = (c1 - c2)/(-a1 + a2) \quad (5)$$

$$y = (F6 \pm \sqrt{F7})/2(a1 - a2)^2 \quad (6)$$

where
F6 = b(−a1+a2)$^2$
F7 = b1$^2$(a1−a2)$^4$−4(a1−a2)$^2${(c1−c2)$^2$ +a1(a1−a2)(c1−c2)−c1(a1−a2)$^2$}

Figure 5:
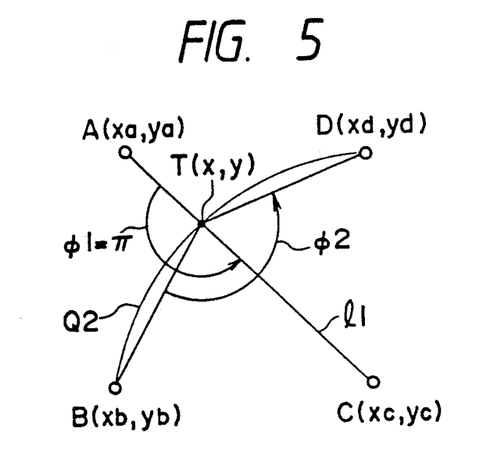

When $\phi 1 = \pi$, Q1 becomes a straight line rather than a circle, and x and Y are calculated by the following equations (7) and (8) as a second exceptional process.

The positional relationships between the moving vehicle 1 and the reference points A-D when Q1 is the straight line are shown in FIG. 5 where a pair of the reference points A and C are connected by the straight line 11.

$$x = (-F8 \pm \sqrt{F9})/2(1 + d1^2) \quad (7)$$

$$y = d1 \cdot x + e1 \quad (8)$$

where
F8 = (2d1·e1−a2−b2·d1)
F9 = a2$^2$+b2$^2$·d1$^2$−4a2·d1·e1+2a2·b2·d1−4e1$^2$ +4b2·e1+4c2+4c2·d1$^2$
d1 = (ya−yc) / (xa−xc)
e1 = (xa·yc−xc·ya) / (xa−xc)

Figure 6:
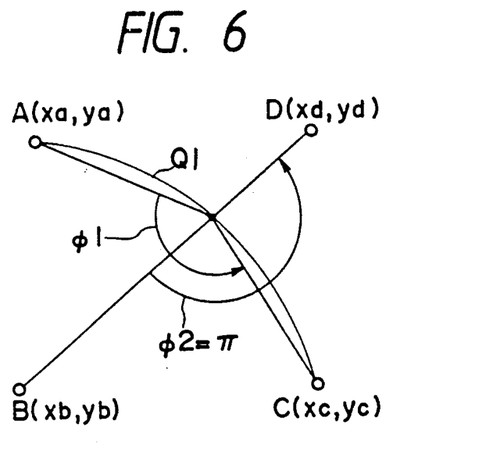

When $\phi 2 = \pi$, Q2 becomes a straight line rather than a circle, and x and Y are calculated by the following equations (9) and (10) as the third exceptional process. The positional relationships between the moving vehicle 1 and the reference points A−D when Q2 is the straight line are shown in FIG. 6 where a pair of the reference points B and D are connected by the straight line 12.

$$x = (-F10 \pm \sqrt{F11})/2(1 + d2^2) \quad (9)$$

$$y = d2 \cdot x + e2 \quad (10)$$

where
F10 = 2(d2·e2−a1−b1·f2)
F11 = a1$^2$+b1·d2$^2$−4a1·d2·e2+2a1·b1·d2−4e2$^2$ +4b1·e2+4c1+4c1·d2$^2$
d2 = (yb−yd) / (xb−xd)
e2 = (xb·yd−xd·yb) / (xb−xd)

However, since equations (3), (6), (7), and (9) have two solutions, respectively, one of them should be chosen as a pertinent solution by judging whether differential azimuths $\phi 1$ and $\phi 2$ are greater or smaller than $\pi$. More particularly, as is apparent from FIG. 2, for the angle $\phi 2$, for example, when point T is on the upper side of the straight line connecting a pair of points B and D, the angle $\phi 2$ is smaller than $\pi$, and conversely when point T is on the lower side of the line BD, the angle $\phi 2$ is larger than $\pi$. Hence, either one of the angles can be selected as one corresponding to the real current position T using the value of angle $\phi 2$ actually measured.

When $\phi 1 = \phi 2 =$, the moving vehicle 1 is at the intersection of the first straight line connecting reference points A and C, and the second straight line connecting reference points B and D. In this case, x and y are calculated by the following equations (11) and (12).

$$x = -(e1-e2) / (d1-d2) \quad (1)$$

$$Y = d \cdot x + e1 \quad (12)$$

The advance direction of the moving vehicle 1 is calculated in the following manner In FIG. 3, when the angle between the advance direction TT' of the moving vehicle 1 and the x-axis is $\theta f$, and each azimuthal or rotational angle to the reference points A, B, C, and D from the advance direction as a reference orientation is $\theta a$, $\theta b$, $\theta c$, and $\theta d$, respectively, the advance direction $\theta f$, i.e., an inclination of the line segment TT' with respect to the x-axis is calculated by any one of the following equations (13)-(16).

$$\theta f = 90° + \tan^{-1} k1 - \theta a \quad (13)$$

$$\theta f = 180° + \tan^{-1} k2 - \theta b \quad (14)$$

$$\theta f = 270° + \tan^{-1} k3 - \theta c \quad (15)$$

$$\theta f = 360° + \tan^{-1} k4 - \theta d \quad (16)$$

where
k1 = (x − xa) / (ya − y)
k2 = (y − yb) / (x − xb)
k3 = (xc − x) / (y − yc)
k4 = (yd − y) / (xd − x)

One particular one equation is chosen for calculation in accordance with the calculation timing of the advance direction of the moving vehicle 1, and $\theta f$ is calculated based on the up-to-date value at the present time among the azimuths $\theta a - \theta d$.

Figure 7:
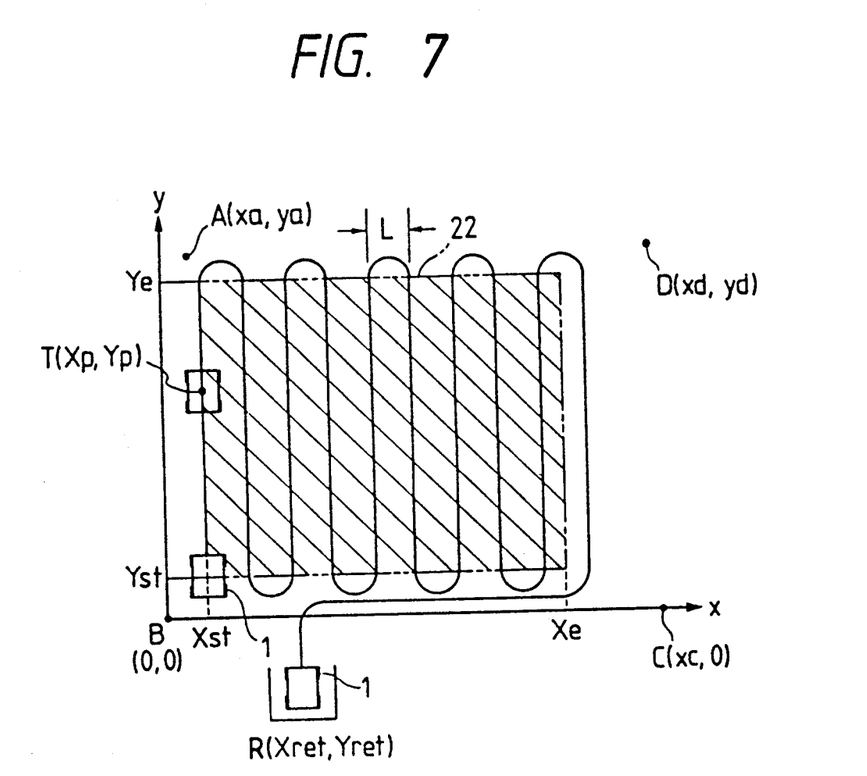
FIG. 7 is an arrangement diagram showing a traveling course for the moving vehicle and the reflectors.
Figure 8:
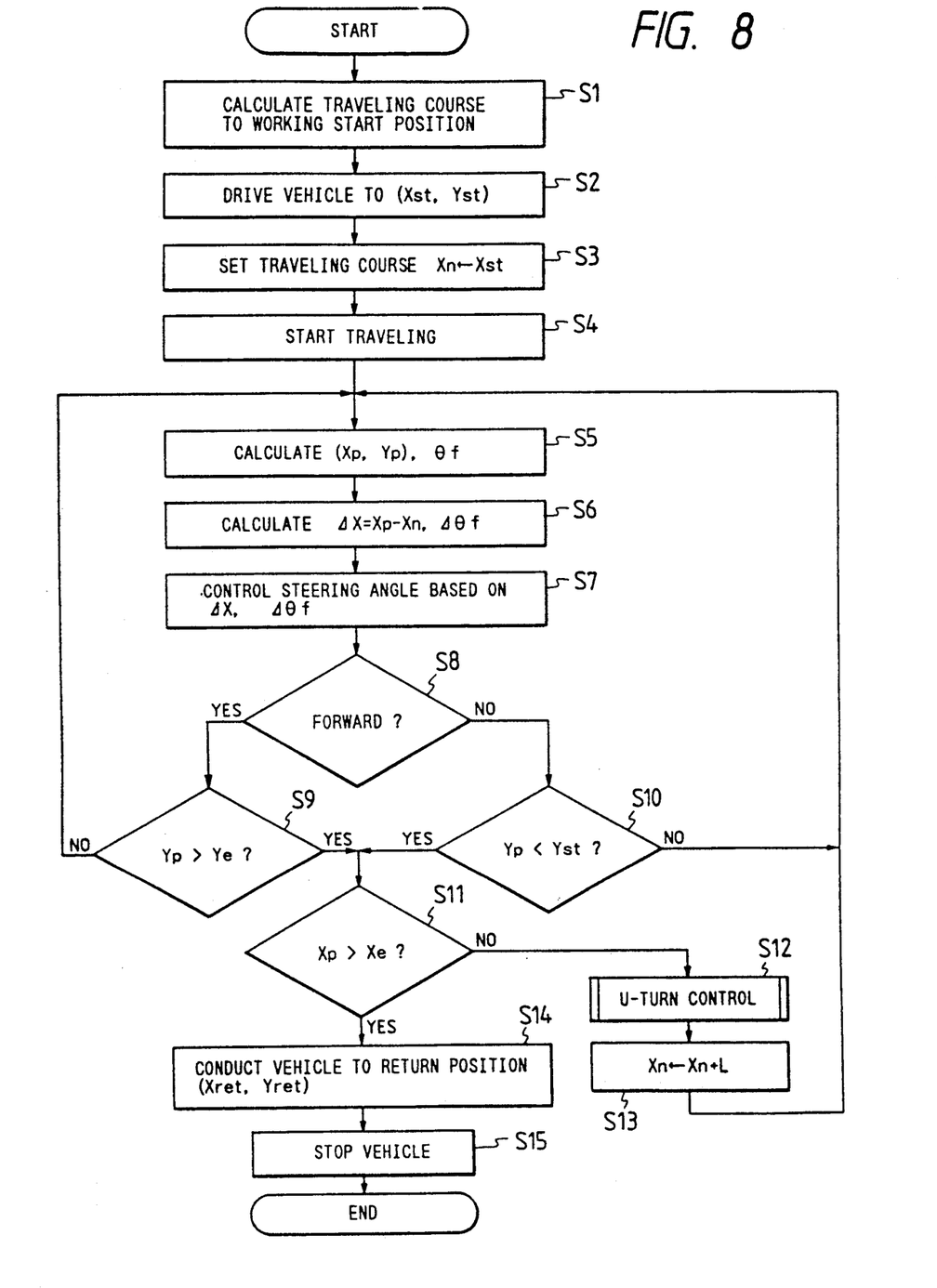
FIG. 8 is a flowchart showing a steering control according to the present invention.

Next, steering control for the moving vehicle 1 based on positional information of the moving vehicle 1 calculated in accordance with the above procedure will be described hereinbelow. FIG. 7 is a schematic diagram showing a state of arrangement in respect of a traveling course of the moving vehicle 1 and reflectors 6, and FIG. 8 is a flowchart illustrating a procedure for steering control.

In FIG. 7, points A, B, C and D indicate positions at which the reflectors 6a-6d are disposed, and a position and a working area 22 of the moving vehicle 1 are represented on a coordinate system wherein the point B is fixed as the origin, and a straight line extending between the points B and C is defined as the x-axis. (Xret, Yret) indicate coordinates of a returning position R of the moving vehicle 1, and the working area 22 is a quadrilateral region including four apexes of the points represented bY four coordinates (Xst, Yst), (Xst, Ye), (Xe, Yst) and (Xe, Ye). In this case, the current position of the moving vehicle 1 is represented by T(Xp, Yp).

For simplicity, an example wherein four sides of the working area 22 are parallel to the x- or y-axes is shown in FIG. 7, but another direction and/or shape of the working area maY be selected so far as the points A-C or reflectors 6a-6d are disposed around the working area 22.

In accordance with the flowchart shown in FIG. 8, a control procedure will be described hereinbelow in which it is assumed that the moving vehicle 1 reciprocates in parallel to the Y-axis as in the traveling locus of FIG. 7, and the pitch therefor is L.

In step S1, a steering angle of the front wheels for the vehicle to advance to a working start position is culculated on the basis of both coordinates of the current position which is now the returning position R(Xret, Yret) of the moving vehicle 1 obtained in the position-advance direction operating means 13 and of the working start position (Xst, Yst) which has been set in the traveling course setting means 16.

In step S2, the engine is started by the driving means 18 and the front wheels are steered in accordance with the steering angle calculated in the preceding step S1. Then, the clutch is engaged to drive the moving vehicle 1 and it is positioned at the working start position (Xst, Yst).

In step S3, Xst is set as an X-coordinate of the traveling course Xn so that the traveling course is decided.

When starting the travel of the moving vehicle 1 in step S4, the moving vehicle 1 calculates the current position (Xp, Yp) and the advance direction $\theta f$ thereof in step S5.

In step S6, a deviation amount of the traveling course ($\Delta X = Xp - Xn$, $\Delta \theta f$) is calculated, and a steering angle is controlled in step S7 by the steering means in response to the amount of deviation calculated in the preceding step.

In step S8, it is judged that either the moving vehicle 1 travels towards the direction going away from the origin (forward direction) or the direction approaching the origin reverse direction) in the y-axial direction.

In case of forward direction, it is judged whether one stroke is finished (Yp > Ye) or not in step S9, while in case of reverse direction, it is judged whether one stroke is finished (Yp < Yst) or not in step S10. When it is judged that one stroke is not finished in either step S9 or step S10, processings in steps S5-S8 are repeated.

In case it is judged that such one stroke is finished in either step S9 or S10, it is judged in the following step S11 whether all the strokes are finished (Xp > Xe) or not.

When all strokes are not finished, the procedure shifts from step S11 to step S12 to effect U-turn control of the moving vehicle 1. U-turn control is carried out in accordance with a different method from the one for steering control in a straight traveling course which is effected according to processing steps S5-S7 wherein the positional information of the moving vehicle 1 calculated by the position-advance direction operating means 13 is fed back to the steering means 14.

More specifically, it is adapted that the vehicle 1 is traveled while fixing a steering angle thereof at a predetermined angle in a turning course, and the moving vehicle returns to steering control for a straight traveling course which is effected in accordance with processings of steps S5-S7 at the time when at least one of the azimuths of the respective reflectors 6 or reference points A-D, viewed from the vehicle 1 and which are calculated based on the differential azimuths detected in the angle detection means 10, coincides substantially with a predetermined azimuth. The details of U-turn control for traveling the moving vehicle along the turning course is described in the Japanese Patent Application No. 149619/88 corresponding to the U.S. Pat. application Ser. No. 362,630.

In step S13, a pitch L is added to Xn thereby calculating (Xn + L) and as a result, the following traveling course is set. After setting the following traveling course, the procedure returns to step S5 and the above described processings are repeated.

When all strokes are completed, the moving vehicle returns to the return position R(Xret, Yret) in step S14, and the travel thereof stops in step S15.

Figure 10:
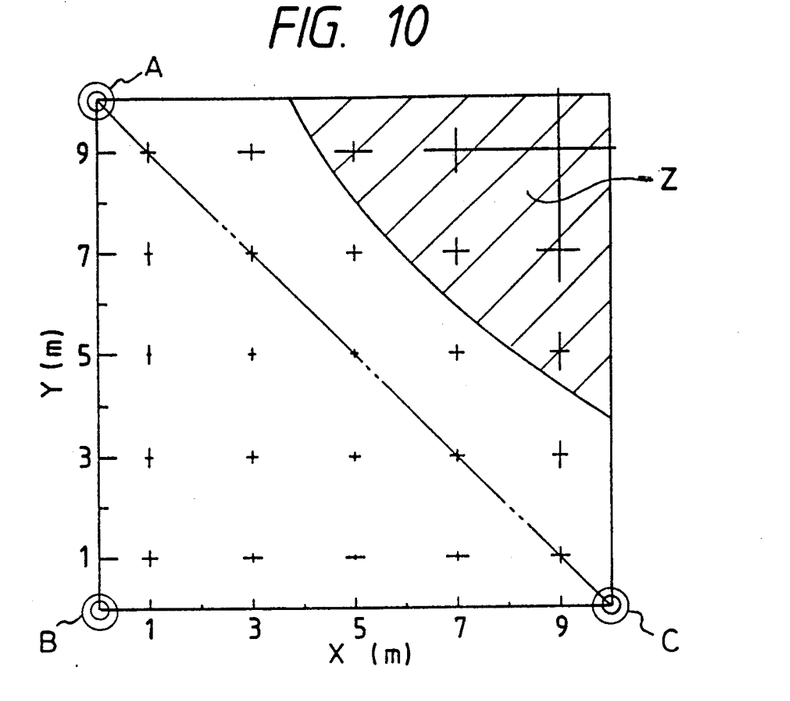
FIGS. 10 and 11 are figures showing the results of position calculating simulation, respectivelY.
Figure 11:
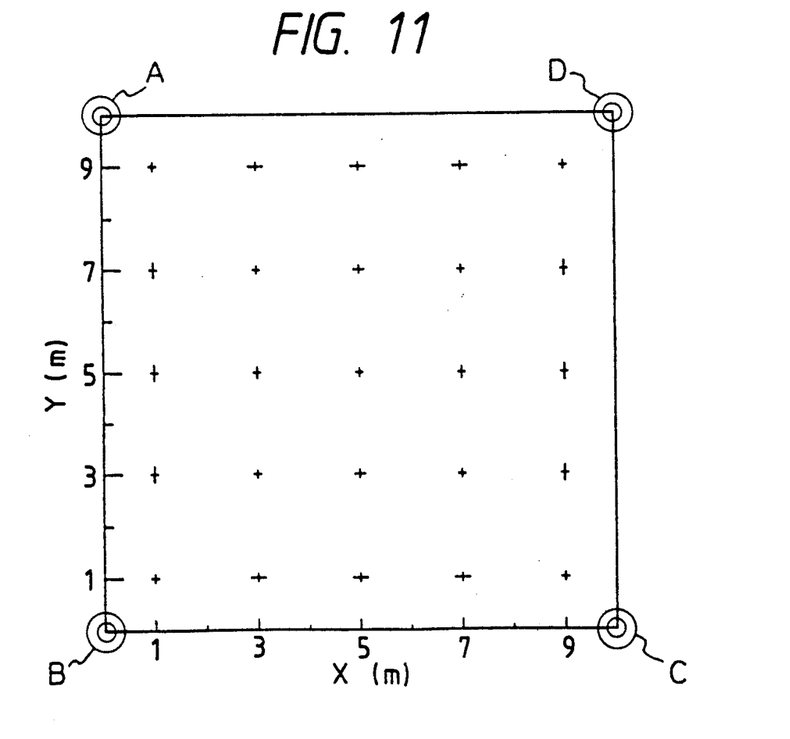

The results of a simulation performed to inspect the degree of error between the position calculated on the basis of the reflected light from the reference points and the actual position of the moving vehicle 1 are shown in FIGS. 10 and 11.

In the simulation, the reference points A-D are defined as the vertexes of a square area each side of which is 10 m in length, and light reflectors 6a-6d are placed at the reference points. It is assumed that an error in the measurement of the azimuth of each reference point from the moving vehicle is ±1 degree, and the moving vehicle 1 is positioned for simulation at every 2 m over the entire measured area.

FIG. 10 shows the results of the simulation in which the position of the moving vehicle 1 is calculated on the basis of the light signals from three light reflectors located at reference points A, B, and C in accordance with a conventional method. FIG. 11 shows the results of the simulation in which the position of the moving vehicle 1 is calculated on the basis of the light signals from four light reflectors located at reference points A, B, C, and D according to the present invention.

In these figures, errors between the calculated position and the actual position of the moving vehicle in the x and y directions are indicated by cross-shaped marks. The magnitude of the error in the x direction is indicated by the length of the cross mark in the x direction. The magnitude of the error in the y direction is indicated by the length of the cross mark in the y direction. The intersections of the crosses indicate the actual positions of the moving vehicle, respectively.

As shown in FIG. 10, the error is large at positions apart from reference points A, B, and C, i.e., positions outside of the triangle ABC. In the shaded zone Z which is extremely apart from the triangle ABC, errors of 143 cm maximum are observed both in the x and y directions.

Also, in FIG. 10, even in the region inside the triangle ABC, errors of 20 cm maximum are observed both in the x and y directions. It may be said that the error of 20 cm indicates an error by a conventional method in which optimum three reference points are selected out of the four reference points based on the current position of the moving vehicle, and the current position of the moving vehicle 1 is detected on the basis of the differential azimuths between the selected three reference points.

On the other hand, as shown in FIG. 11, errors in the x and y directions are confined to 14 cm maximum, respectively, and moreover the scatter of the errors in the calculated positions of the moving vehicle are very small over the entire region of the measurement in accordance with the present invention.

As described above, in this embodiment, the current position of the moving vehicle is detected based on the two differential azimuths between each pair of reflectors located at diagonal positions among the reflectors placed at four reference points. As a result, as shown in the results of the simulation, an error between the calculated position and the actual position of the moving vehicle can be confined to a very small value.

In this embodiment, the light beam source and the beam receiver are both mounted on the moving vehicle. However, the present invention can be embodied in a system in which light emitting means are placed at the reference points, and only a beam receiver is mounted on the moving vehicle.

The present invention is not limited to a case where reference points are set on only the four points around the working area, but it is applicable to cases where the position of the moving vehicle is detected on the basis of the positional information and the differential azimuths of four reference points at optimum positions of of more than four reference points.

As is apparent from the above description, according to the present invention, an error in a position measurement can be made to be very small compared with a conventional method in which the position of the moving vehicle is detected on the basis of the azimuths of three reference points and the differential azimuths between said three reference points. Furthermore, scatter of the errors can be made small over the entire region of work for the moving vehicle, so uniformity of various works using the moving vehicle is improved.

The switching of the reference points indispensably required in the conventional method in which three reference points are selected out of four to calculate the position of the moving vehicle on the basis of the azimuths of the selected three reference points and the differential azimuths between those reference points becomes unnecessary in the present invention, hence the position of the moving vehicle can be detected continuously and the control system is simplified in accordance with the present invention. Furthermore, an increase in error due to the switching of the selected reference points will be suppressed in the present invention.

What is claimed is:

1. A steering system for a moving vehicle wherein light signals are received from light beam source means provided at four reference points apart from the moving vehicle and a current position of the moving vehicle is detected based on the received light signals and positional information of the reference points, comprising;

beam receiver means for receiving the light signals, said beam receiver means being mounted on the moving vehicle and rotatable in a horizontal plane;

means for detecting azimuths of the reference points with respect to the advance direction of the moving vehicle on the basis of the light signals received by the beam receiver means;

means for calculating two differential azimuths corresponding to two pairs of reference points, each of said pairs being disposed on diagonal positions viewed from the moving vehicle;

calculating means for calculating the position of the moving vehicle on the basis of the detected azimuths, the calculated differential azimuths, and the positional information of the reference points;

means for setting a desired course of travel of said moving vehicle;

steering means for steering said moving vehicle; and means responsive to a comparison between said desired course of travel and said calculated position of the moving vehicle for controlling said steering means.

2. The steering system of claim 1 wherein said calculating means for calculating the position of the moving vehicle is operative to calculate the position of the moving vehicle, on the assumption that the moving vehicle lies on either one of the two intersections of a first circle passing through one pair of reference points disposed at one of two diagonal positions and the current position of the moving vehicle, and of a second circle passing through the other pair of reference points disposed at the other of said two diagonal positions and the current position of the moving vehicle, by calculating the intersections of the two circles on the basis of the differential azimuths and the positional information of the reference points.

3. The steering system of claim 1 wherein said light beam source means comprises a light beam emitter mounted on the moving vehicle and rotatable along with the beam receiver means, and light reflecting means disposed at the reference points to reflect the light radiated from the light beam emitter in the incidence direction thereof.

4. The steering system of claim 2 wherein said means for calculating the position of the moving vehicle that is to be used in controlling said steering means includes means for comparing the calculated differential azimuths with $\pi$.

5. The steering system of claim 2 wherein the calculating means for calculating the position of the moving vehicle additionally calculates the advance direction of the moving vehicle on the basis of the azimuths of the reference points.

* * * * *